US010126541B2

(12) United States Patent
Dybiec

(10) Patent No.: US 10,126,541 B2
(45) Date of Patent: Nov. 13, 2018

(54) ENDOSCOPIC ILLUMINATING AND IMAGING SYSTEMS AND METHODS

(71) Applicant: Integrated Medical Systems International, Inc., Birmingham, AL (US)

(72) Inventor: Maciej Dybiec, Cooper City, FL (US)

(73) Assignee: STERIS Instrument Management Services, Inc., Birmingham, AL (US)

( * ) Notice: Subject to any disclaimer, the term of this patent is extended or adjusted under 35 U.S.C. 154(b) by 0 days.

(21) Appl. No.: 15/079,527

(22) Filed: Mar. 24, 2016

(65) Prior Publication Data

US 2016/0282603 A1 Sep. 29, 2016

Related U.S. Application Data

(60) Provisional application No. 62/138,730, filed on Mar. 26, 2015.

(51) Int. Cl.
*G02B 6/06* (2006.01)
*G02B 23/24* (2006.01)
*G02B 23/04* (2006.01)

(52) U.S. Cl.
CPC ......... *G02B 23/2461* (2013.01); *G02B 23/04* (2013.01); *G02B 23/243* (2013.01); *G02B 23/2446* (2013.01)

(58) Field of Classification Search
CPC .. G02B 23/2461; G02B 23/243; G02B 23/04; G02B 23/2446
USPC ................. 362/84, 574, 268, 293, 300, 307; 600/101, 177, 178, 181, 182
See application file for complete search history.

(56) References Cited

U.S. PATENT DOCUMENTS

| 3,456,641 | A | * | 7/1969 | Yutaka | A61B 1/05 356/51 |
| 5,645,519 | A | * | 7/1997 | Lee | A61B 1/2676 600/114 |
| 5,800,342 | A | * | 9/1998 | Lee | A61B 1/303 600/114 |
| 5,840,013 | A | * | 11/1998 | Lee | A61B 1/303 600/114 |
| 7,405,877 | B1 | * | 7/2008 | Schechterman | A61B 1/00096 359/462 |
| 2002/0026099 | A1 | * | 2/2002 | Adachi | A61B 1/00009 600/178 |
| 2002/0062064 | A1 | * | 5/2002 | Nakamura | A61B 1/05 600/178 |
| 2002/0103439 | A1 | * | 8/2002 | Zeng | G01J 3/0289 600/476 |

(Continued)

*Primary Examiner* — Paultep Savusdiphol
(74) *Attorney, Agent, or Firm* — C. Brandon Browning; Maynard, Cooper & Gale, PC

(57) ABSTRACT

The present disclosure generally pertains to endoscopes configured to utilize a single optical channel for both image extraction and illumination. In certain embodiments, the disclosure contemplates an endoscope configured with a source of illumination outside of the visible spectrum, such as ultraviolet (UV) light, with the endoscope configured to down-convert such illumination into visible light at the distal end of the endoscope. This configuration not only avoids or reduces image flooding caused by the unwanted reflections on optical surfaces within the endoscope relays and objective, but also doubles the effective area of the lenses, thereby allowing higher quality imaging.

8 Claims, 5 Drawing Sheets

(56) References Cited

U.S. PATENT DOCUMENTS

| | | | |
|---|---|---|---|
| 2003/0158470 A1* | 8/2003 | Wolters | A61B 1/043 600/317 |
| 2004/0176664 A1* | 9/2004 | Iddan | A61B 1/00156 600/160 |
| 2005/0167621 A1* | 8/2005 | Zeng | G01J 3/0289 250/580 |
| 2005/0203421 A1* | 9/2005 | Zeng | G01J 3/0289 600/476 |
| 2005/0203423 A1* | 9/2005 | Zeng | G01J 3/0289 600/476 |
| 2005/0288553 A1* | 12/2005 | Sugimoto | A61B 1/0005 600/118 |
| 2005/0288556 A1* | 12/2005 | Sugimoto | A61B 1/00009 600/160 |
| 2006/0149133 A1* | 7/2006 | Sugimoto | A61B 1/0638 600/160 |
| 2007/0093688 A1* | 4/2007 | Enomoto | A61B 1/00009 600/101 |
| 2009/0292168 A1* | 11/2009 | Farr | A61B 1/0607 600/109 |
| 2013/0278738 A1* | 10/2013 | Hayashi | H04N 5/2354 348/68 |

* cited by examiner

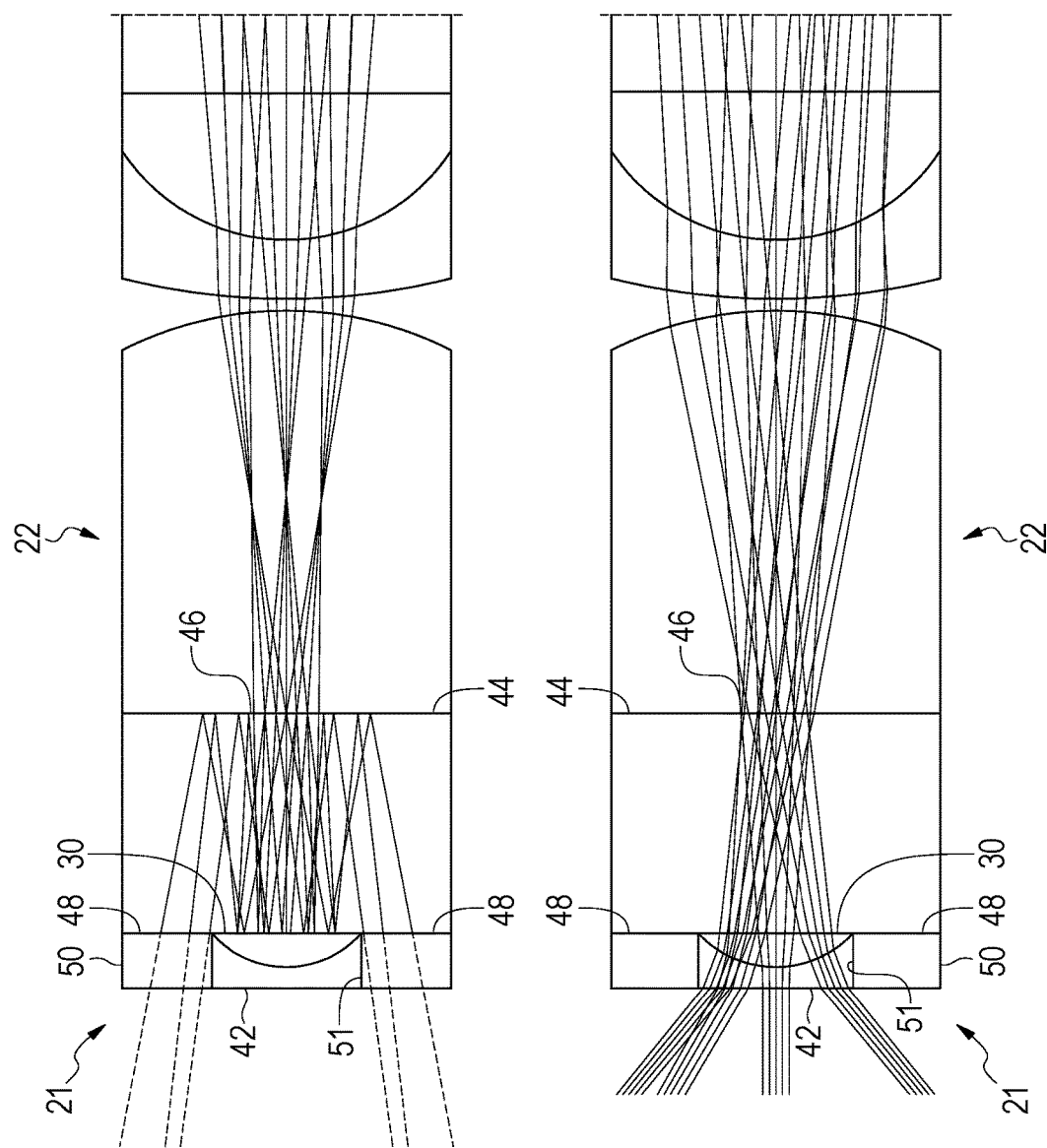

ENDOSCOPIC ILLUMINATING AND IMAGING SYSTEMS AND METHODS

RELATED APPLICATIONS

This application claims priority to U.S. Provisional Application No. 62/138,730, entitled, "Endoscope Illuminating and Imaging Systems and Methods," and filed on Mar. 26, 2015, the entire contents of which are incorporated herein by reference.

FIELD OF INVENTION

The present disclosure relates to optical systems for endoscopes which are capable of both illuminating and imaging an object using one channel.

BACKGROUND OF THE INVENTION

Current rigid endoscopy technology makes use of two optical channels, one used for light delivery and the other used for image extraction. A significant flaw to this solution is that the effective area of each channel is roughly half of the cross-sectional area of the endoscope. Where the first lens is a negative lens, this ratio can be worse. In other words, only a small portion of the negative lens is used for image collection, while the rest of the surrounding area is left unused thereby wasting surface area on the tip of the endoscope that could otherwise be used for light delivery. Thus, when separate channels are used for image extraction and target illumination, only half of the scope area is effectively used to collect the image, while the other half delivers light for object illumination.

From a physics standpoint, however, there is no limitation of sending two beams of light through the same optical channel for systems composed of linear elements. In such an arrangement, the two beams do not interfere with each other, and there is no image disruption, even if the image is superimposed over the illumination beam. The difficulty with such an endoscopic solution is that classical illumination systems are realized in the visible part of the spectrum. Thus, when the illumination beam is sent through the imaging lenses, the intensity of the reflected portion of the illumination beam overcomes the image beam by orders of magnitude, preventing the scope from rendering any useful image.

SUMMARY OF THE INVENTION

The present invention is directed to an endoscope optical assembly including a single optical channel through which both image extraction and object illumination occur. According to one aspect of the invention there is provided an endoscope illumination system including an optical channel including an objective and a relay lens system. A light source is operatively coupled to the optical channel and arranged to transmit light distally through the relay lens system and the objective. A first dichroic mirror is operatively coupled between the light source and the optical channel and incorporated within a proximal most segment of the relay lens system. The first dichroic mirror is arranged to both reflect an ultraviolet light portion of the light emitted from the light source distally through the relay lens system and the objective and allow a visible light portion to pass therethrough.

The objective includes a second dichroic mirror that is arranged to reflect the ultraviolet portion of the light emitted by the light source proximally through the objective. The second dichroic mirror is light transparent and located under a negative lens. The objective also includes a third mirror and a fourth dichroic mirror, each of which includes a central aperture. The third mirror is arranged to reflect the ultraviolet light received from the second dichroic mirror distally. The fourth dichroic mirror is ultraviolet light transparent and arranged to receive the ultraviolet light reflected distally by the third mirror. Encircling the negative lens is a down converting element arranged to receive the ultraviolet light emitted by the light source and emit visible light distally out of the objective. The down converting element may be a red, green, blue (RGB) phosphorous ring. At the proximal end of the optical system is an ocular containing an ultraviolet light blocking filter. Arranged as described above, the present system forms a light path that includes a first ultraviolet light portion reflected distally through the relay lens system by a first mirror towards a second mirror located in the objective, a second ultraviolet light portion reflected proximally by the second mirror towards a third mirror located in the objective, and a third ultraviolet light portion reflected distally by the third mirror towards a fourth mirror that is ultraviolet light transparent.

According to another aspect of the invention there is provided a method of transmitting illumination light and an object image through a single optical channel of an endoscope. The method can be characterized as having two steps, including a first step of directing light through the optical channel onto an object and a second step of transmitting an object image through the optical channel. More particularly, the first step includes (i) arranging a light source to direct light onto a first mirror located within the optical channel, the first mirror being visible light transparent and ultraviolet light opaque, (ii) arranging the first mirror to reflect a ultraviolet light portion of the light distally through a relay lens system and an objective of the optical channel, (iii) converging the ultraviolet light portion within the lens relay system away from image forming surfaces of the lens of the relays lens system (iv) arranging a second mirror within the objective to receive the ultraviolet light portion from the first mirror and reflect the ultraviolet light portion proximally, the second mirror being visible light transparent and UV light opaque, (v) arranging a third mirror to receive the ultraviolet light from the second mirror and reflect the ultraviolet light distally, the third mirror having a central aperture therethrough, (vi) arranging a fourth mirror to receive the ultraviolet light from the third mirror, the fourth mirror being ultraviolet light transparent and visible light opaque, and (vii) converting the ultraviolet light portion to visible light at a distal end of the objective and directing the visible light onto an object. The second step includes (viii) receiving an object image of the object, (ix) transmitting the object image proximally through the objective, the relay lens system, the second mirror, a central aperture of the fourth mirror, the central aperture of the third mirror and the first mirror, and (ix) receiving the object image at an ocular incorporating an ultraviolet light filter.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 5A depicts an ultraviolet illumination rays trace for an objective of the endoscope of FIG. 2.

FIG. 5B depicts an image forming rays trace the objective of FIG. 5A.

DETAILED DESCRIPTION OF THE INVENTION

Figure 1:
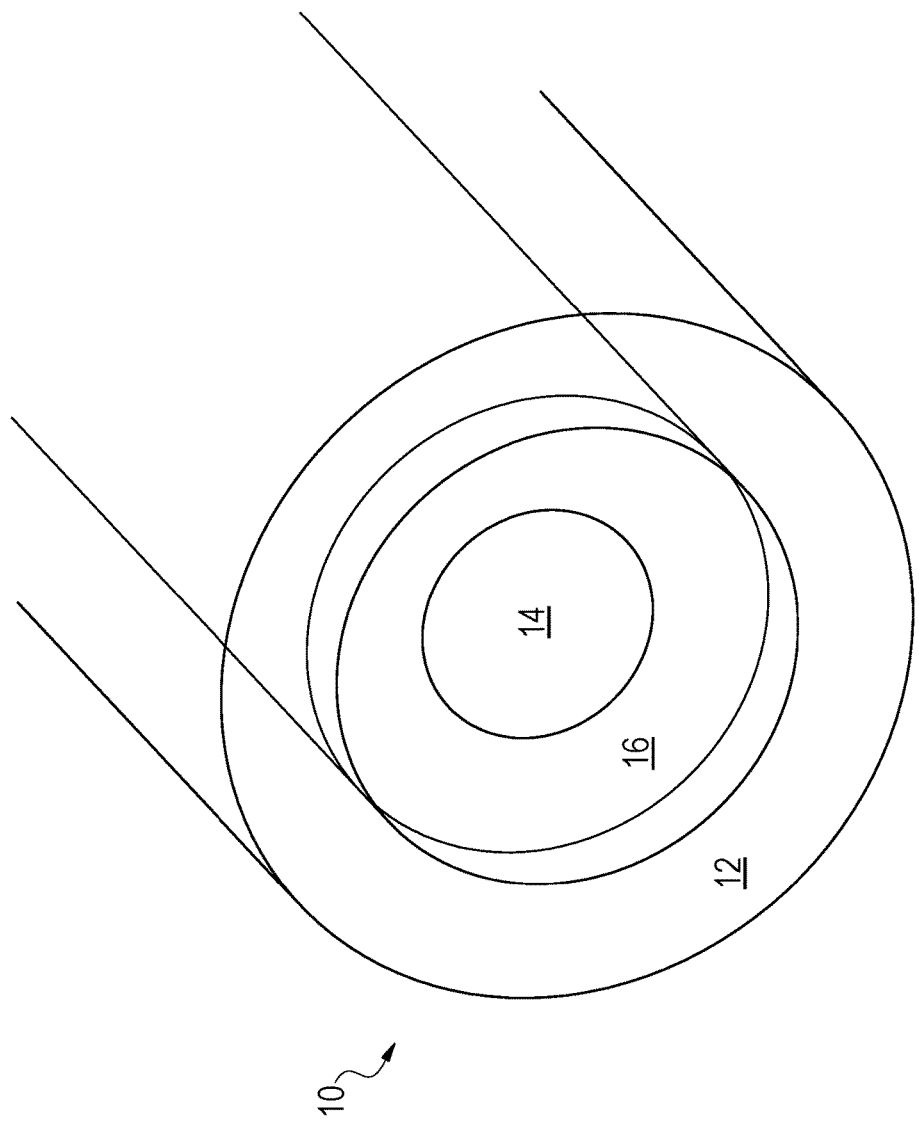
FIG. 1 depicts an area breakdown of a distal end of rigid endoscope in accordance with the prior art.

Depicted in FIG. 1 is a distal end of a conventional endoscope 10 showing the area of each of the surfaces presented at the end of the endoscope. In particular, endoscope 10 includes an illumination surface area 12 for transmitting light distally onto an object, the illumination surface area being contained within an illumination channel, an image collection surface area 14 for receiving an object image and transmitting the object image proximally through endoscope 10, the image collecting surface area being defined by an optical channel, and an opaque area 16 for preventing the light transmitted distally through endoscope 10 from interfering with the object image. As illustrated in FIG. 1, by separating the illumination channel and the optical channel into separate channels, each of the illumination surface area and the image collection surface area comprises a fraction of the overall surface area of the distal end of endoscope 10. Thus, only about half of the entire cross-sectional area of endoscope 10 is used to collect the object image and transmit the image distally through the endoscope.

The present invention is directed to endoscopes that utilize a single optical channel for both image extraction and illumination. In certain embodiments, the present invention contemplates an endoscope including a source of illumination outside of the visible spectrum, such as ultraviolet (UV) light, and a down-converter for converting such illumination into visible light at the distal end of the endoscope. This configuration not only avoids or reduces image flooding caused by the unwanted reflections on optical surfaces within the endoscope relays and objective, but also doubles the effective area of the endoscope lenses, thereby providing higher quality imaging.

Figure 2:
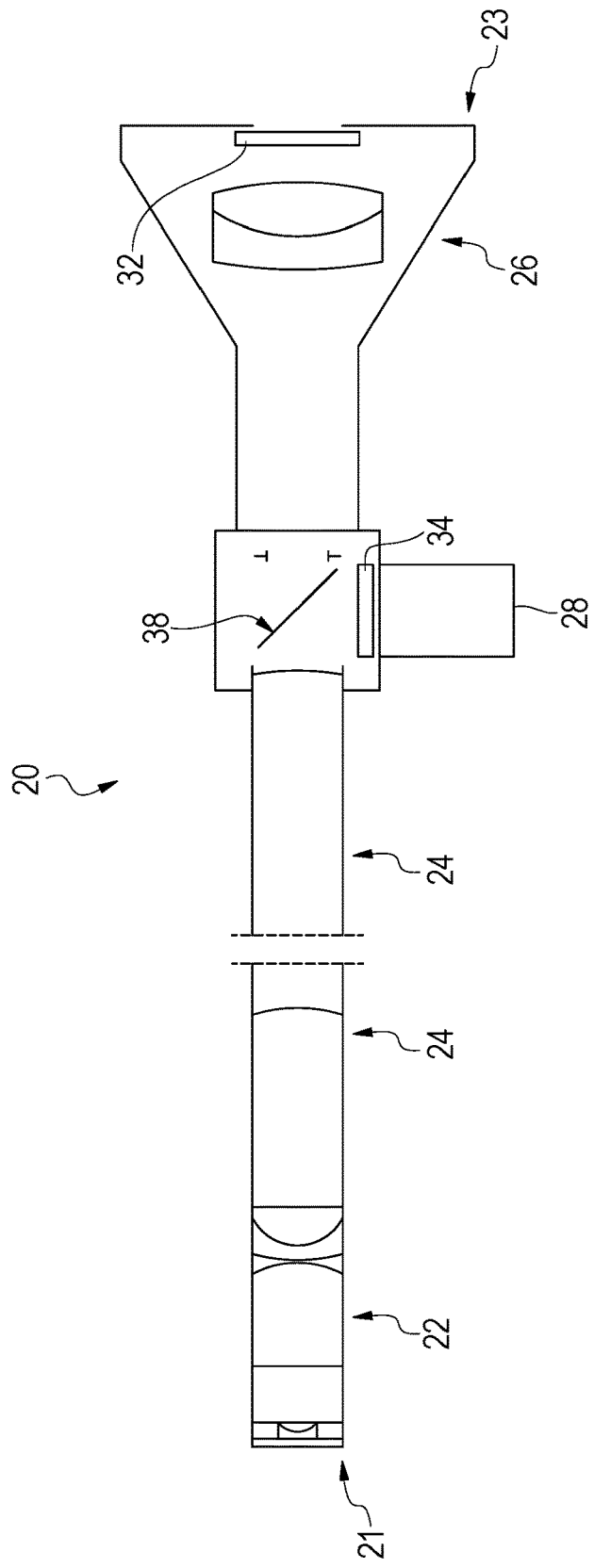
FIG. 2 depicts a schematic representation of an endoscope having a single channel for object illumination and object image extraction in accordance with the present invention.

Referring to FIG. 2, there is depicted an endoscope 20 having a single channel for object illumination and object image extraction in accordance with the present invention. Endoscope 20 is comprised of a body encasing a single chain of optical elements including an objective 22 with a set of mirrors for ultraviolet light delivery and conversion, a relay system 24 and an ocular 26. Compared to conventional endoscopes of similar size, the lenses making up objective 22 and relay system 24 have larger diameters that fully utilize the maximum diameter allowable by the body of endoscope 20. Thus, the endoscope configuration contemplated herein enables lenses of objective 22 and relay system 24 to have almost twice the effective area than conventional endoscopes of similar body size which rely upon illumination elements, such as light bundles.

Endoscope 20 delivers light and extracts images via the same optical channel. The use of the same set of objective 22 and relay system 24 lenses for light delivery and image collection allows for a two-fold increase in the lens diameter due to the elimination of space constraints otherwise imposed by conventional endoscopes, such as by illumination fibers and any extra elements separating lenses from light fibers, such as depicted in FIG. 1. As contemplated herein, the cross-sectional area of endoscope 20 is occupied by larger lenses capable of providing superior image quality by increased resolution and brightness than the lenses of conventional endoscopes. Larger lens diameters also allow for higher illumination flux intensity for illuminating the end of the endoscope than conventional lens diameters. Further, less expensive and less efficient down-converting elements, which change non-visible light into visible light, are used in the present invention since endoscope 20 has twice the intensity of pumping light flux due to the larger lens diameter.

Endoscope 20 utilizes light delivery from the non-visible part of the electromagnetic spectrum. One primary advantage of using non-visible light as illumination is that the reflected light, which inevitably occurs from light passed through many lens surfaces on the way to a distal end 21 of endoscope 20, will not add to or interfere with the light transmitted proximally from the object. In other words, the image delivered proximally by endoscope 20 is neither flooded nor suppressed by the illumination light travelling distally. The illumination light may ultraviolet (UV) light or infrared (IR) light. The embodiment described herein contemplates an ultraviolet illumination source.

Figure 3:
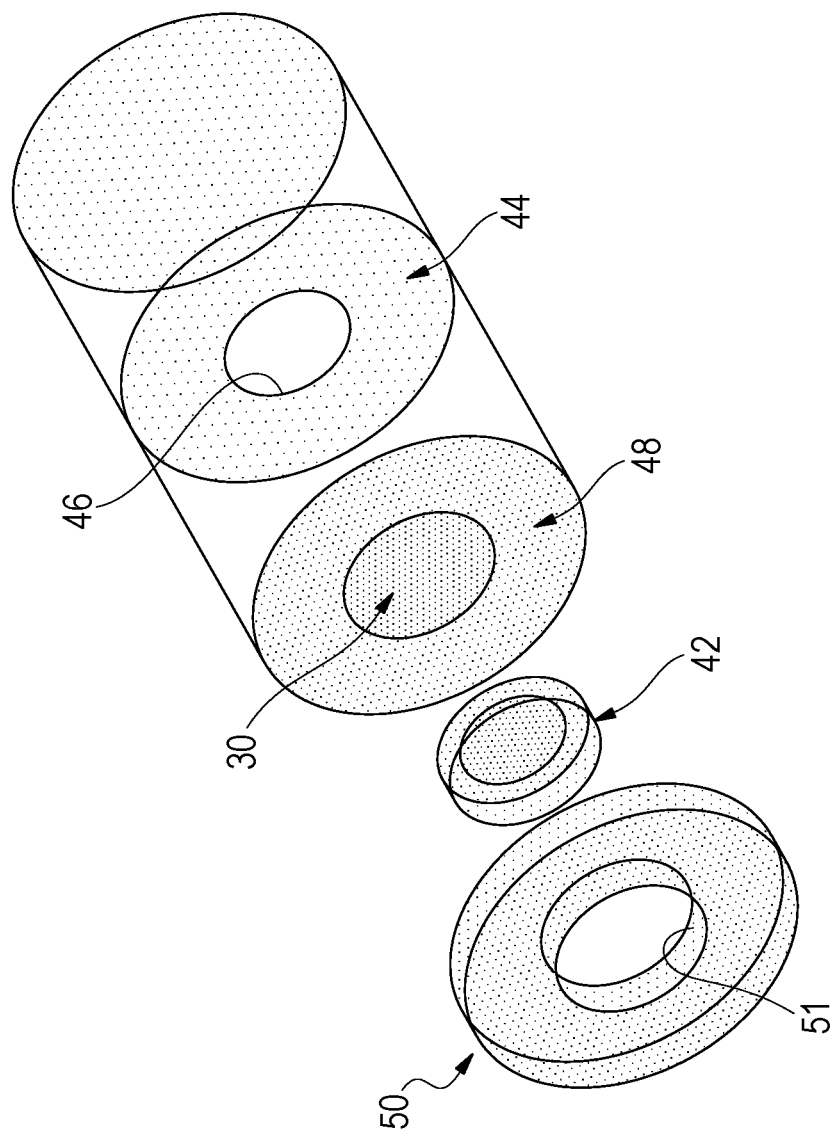
FIG. 3 depicts an objective of the endoscope of FIG. 2.

Referring to FIGS. 2 and 3, endoscope 20 includes a source of ultraviolet illumination, namely, a light post 28 and further includes two ultraviolet filters configured to prevent ultraviolet light from escaping from endoscope 20. A first ultraviolet filter 30 is located at distal end 21 of endoscope 20 in the form of an ultraviolet light opaque, visible light transparent dichroic mirror, such as is depicted in FIG. 3. A second ultraviolet filter 32 is located in ocular 26 of endoscope 20 to prevent any reflected ultraviolet light to reach a user's eye or a camera sensor, such as is depicted in FIG. 2.

Figure 4:
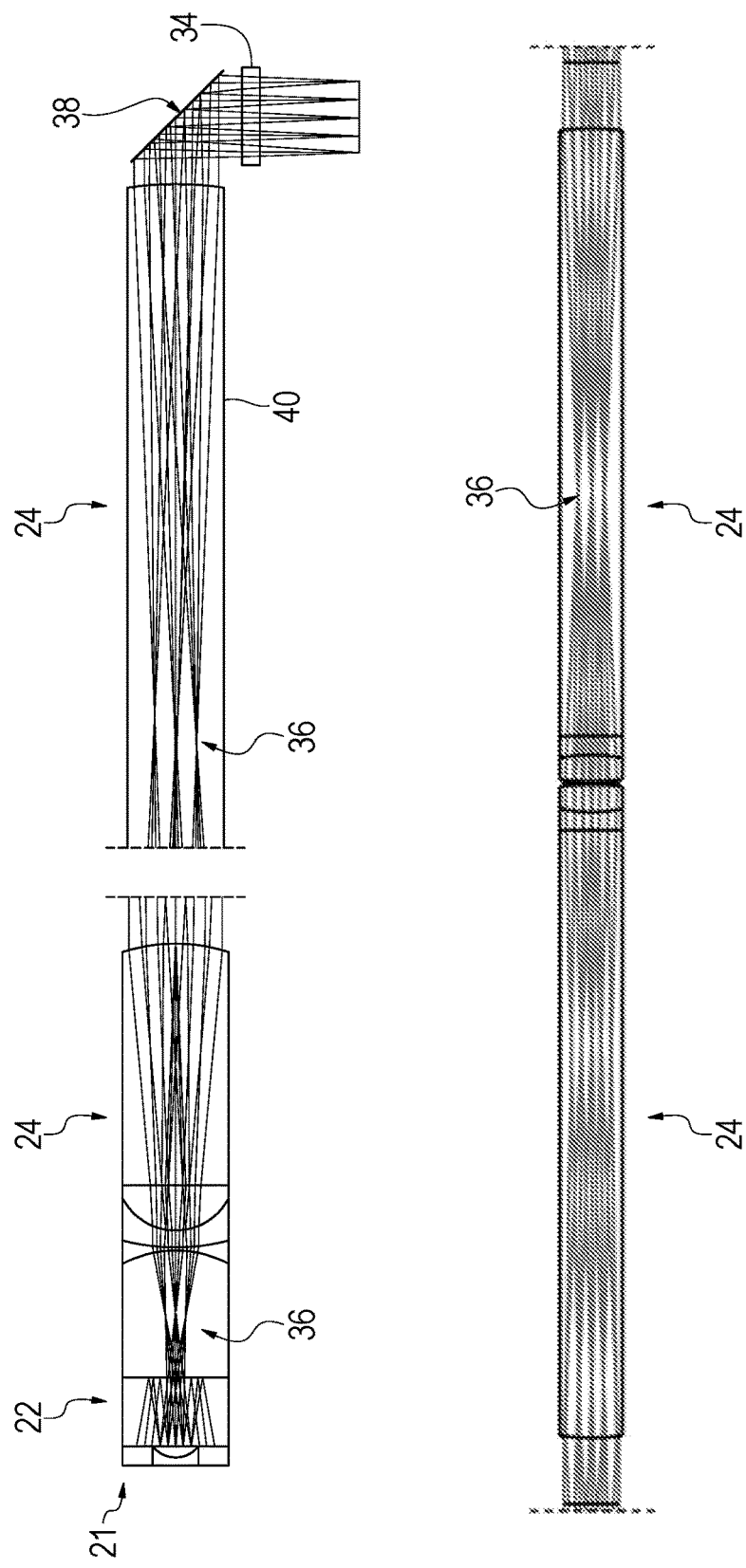
FIG. 4 depicts an ultraviolet illumination rays trace for a distal end section, a middle section and a proximal end of a relay system of the endoscope of FIG. 2.

Light post 28 is configured to deliver ultraviolet light delivery to an adjustable lens 34 which can adjust the focus of incoming ultraviolet light for achieving the best possible illumination at distal end 21 of endoscope 20. As depicted in FIG. 4, the ability to adjust the focus of incoming ultraviolet light ensures that the ultraviolet light delivery beam has its focusing points within the glass elements of objective 22 and relay system 24 separate and distal from their respective surfaces. This configuration offers a significant advantage over current endoscope configurations since many current anti-reflective coatings deteriorate quickly under prolonged ultraviolet exposure, which the present invention mitigates.

Referring to FIGS. 2 and 4, endoscope 20 is configured such that ultraviolet light injected into light post 28 is reflected via a dichroic mirror 38 and directed towards distal end 21. In certain embodiments, endoscope 20 may include a marker plate (not shown) proximal to the last relay lens surface, thereby necessitating the incorporation of dichroic mirror 38 within the last relay lens 40. As depicted in FIG. 4, dichroic mirror 38 selectively reflects ultraviolet light and allows visible light to pass through. As depicted in FIGS. 3 and 5, endoscope 20 is configured such that once the ultraviolet light reaches objective 22, it is reflected back by dichroic mirror 30, which is located under a negative lens 42 with a metalized edge, as depicted in FIG. 3, and then is defocused before hitting a third, classic mirror 44 having a central aperture 46, such that the light is directed towards distal end 21 as a defocused bundle. This defocused beam is passed through another dichroic mirror 48. Mirror 48 is visible light opaque and ultraviolet transparent such that ultraviolet light passes through and reaches a RGB phosphorous element 50. RGB phosphorous element 50, such as is depicted in FIGS. 3 and 5, includes a central aperture 51 and is configured to down-convert ultraviolet light to visible light while dichroic mirror 48 under RGB phosphorous element 50 reflects back visible light, that otherwise may scatter, back to endoscope 20. Mirror 48 is configured to ensure that all visible light leaves endoscope 20 via its distal end 21 without backlash of visible light into the endoscope.

RGB phosphorous element or ring 50 is an element made out of the material capable of absorbing high energy ultraviolet light and emitting lower energy visible light, namely white light. Such down-converting materials are known in the art and may be configured in shapes and forms suitable for the endoscopes contemplated herein.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

The various embodiments described herein are exemplary and are not intended to confine the scope of this disclosure. Various other embodiments for the systems described herein are possible.

Now, therefore, the following is claimed:

1. A method of transmitting illumination light and an object image through a single optical channel of an endoscope, the method comprising:
    arranging a light source to direct light onto a first mirror located within the optical channel, the first mirror being visible light transparent and ultraviolet light opaque,
    arranging the first mirror to reflect an ultraviolet light portion of the light distally through a lens of a relay lens system and an objective of the optical channel,
    converting the ultraviolet light portion to visible light at a distal end objective and directing the visible light onto an object, and
    receiving an object image of the object and transmitting the object image proximally through the objective and the lens of the relay lens system,
    wherein the objective is arranged distally to the relay lens system and the light source.

2. The method according to claim 1 comprising transmitting the object image through the first mirror.

3. The method according to claim 1 comprising arranging the ultraviolet light portion to converge within the lens of the relay lens system away from image forming surfaces of the lens of the relay lens system.

4. The method according to claim 1 comprising arranging a second mirror within the objective to receive the ultraviolet light portion from the first mirror and reflect the ultraviolet light portion proximally, the second mirror being visible light transparent and ultraviolet light opaque.

5. The method according to claim 4 comprising arranging a third mirror to receive the ultraviolet light from the second mirror and reflect the ultraviolet light distally, the third mirror having a central aperture therethrough.

6. The method according to claim 5 comprising arranging a fourth mirror to receive the ultraviolet light from the third mirror, the fourth mirror being ultraviolet light transparent and visible light opaque.

7. The method according to claim 6 wherein the ultraviolet light portion that passes through the fourth mirror is converted to the visible light and directed onto the object.

8. The method according to claim 7 comprising transmitting the object image distally through the second mirror, a central aperture of the fourth mirror, the central aperture of the third mirror and the first mirror.

* * * * *